United States Patent [19]
Nomura

[11] Patent Number: 5,495,962
[45] Date of Patent: Mar. 5, 1996

[54] CONSTANT QUANTITY DISCHARGING DEVICE FOR POWDERED OBJECT

[75] Inventor: Akichika Nomura, Yotsu-kaido, Japan

[73] Assignee: Kabushiki Kaisha N-Tec, Japan

[21] Appl. No.: 337,062

[22] Filed: Nov. 10, 1994

[30] Foreign Application Priority Data

Nov. 11, 1993 [JP] Japan .............................. 5-060775 U
Aug. 19, 1994 [JP] Japan .................................. 6-195621

[51] Int. Cl.⁶ .................................................. B67D 5/00
[52] U.S. Cl. ............................ 222/80; 222/452; 222/510; 222/240
[58] Field of Search ............................ 222/80, 305, 362, 222/370, 452, 510, 240

[56] References Cited

U.S. PATENT DOCUMENTS

| 2,385,677 | 9/1945 | Bailey | 222/452 |
| 2,636,646 | 4/1953 | Olsen | 222/510 X |
| 2,877,937 | 3/1959 | Weir | 222/452 |
| 3,211,334 | 10/1965 | McShea | 222/452 X |
| 3,695,487 | 10/1972 | Slayton et al. | 222/452 X |
| 4,071,171 | 1/1978 | Bassignani | 222/305 |

FOREIGN PATENT DOCUMENTS

| 59-77153 | 5/1984 | Japan . |
| 60-49556 | 4/1985 | Japan . |
| 61-33964 | 2/1986 | Japan . |
| 61-232176 | 10/1986 | Japan . |
| 452758 | 1/1987 | Japan . |
| 63-1766 | 1/1988 | Japan . |
| 63-23276 | 2/1988 | Japan . |
| 414378 | 6/1989 | Japan . |

Primary Examiner—Gregory L. Huson
Attorney, Agent, or Firm—Basile and Hanlon

[57] ABSTRACT

A constant quantity discharging device for measuring and discharging a constant quantity of powdered object from a powdered object container includes a fixed cap, a rotary disk, and a rotary cap which are coupled and mounted to the container. The rotary disk and the rotary cap sandwiching the fixed cap are rotated manually as a unit with respect to the fixed cap. The rotary disk has a powder taking out aperture, the fixed cap has a powder storing aperture, and the rotary cap has a powder discharging aperture. The positional relationships of these apertures are shifted circumferentially as the rotary disk and the rotary cap are rotated with respect to the fixed cap such that these apertures are sequentially communicated with an adjacent aperture. As a result, the powder in the container is transferred to the powder storing aperture through the powder taking out aperture of the rotary disk, and then the powder is discharged from the powder storing aperture through the powder discharging aperture of the rotary cap. The constant quantity of powder is determined by the volume of the powder storing aperture.

7 Claims, 9 Drawing Sheets

CONSTANT QUANTITY DISCHARGING DEVICE FOR POWDERED OBJECT

BACKGROUND OF THE INVENTION

1. Field of the Invention

The present invention relates to a constant quantity discharging device which enables any person to take out a constant quantity of a powdered object in a simple manner from a container accommodating various kinds of powdered objects including powdered coffee, powdered milk, leaves and stems of green tea, black tea, powdered detergent, granule type or powder type pharmaceuticals, metal powder, etc.

2. Description of the Prior Art

Generally, in taking out a powdered object, such as powdered coffee, powdered milk, or the like, from an accommodating container, a predetermined quantity is taken out by utilizing a measuring cup or a cap of the accommodating container, or the like. However, in such a method, a problem is involved in that each time the container is opened, since humid air enters the container, the quality of the accommodated object is deteriorated and the taste and flavor are lost. Furthermore, in the case where leaves and stems are mixed, it is difficult to take out an accurate quantity, and it takes labor and time to take out a predetermined quantity of a powdered object.

Accordingly, recently, a technique which enables a constant quantity of powdered coffee to be taken out is proposed in Japanese Patent Laid-Open Publication No. 61-232176. A container of developer is proposed in Japanese Utility Model Laid-Open Publication No. 63-23276, which does not enable the supply of powdered developer into a developer hopper during supply thereof, but does prevent the surrounding place from being made dirty and prevents the powdered developer from being scattered. A technique for enabling a constant quantity of tea leaves to be taken out is proposed in Japanese Utility Model Laid-Open Publication Nos. 63-1766 and 4-14378. A technique which enables a constant quantity of a pharmaceutical to be taken out by displaying a dial type scale on an upper portion of a container is proposed in Japanese Patent Laid-Open Publication No. 61-33964.

However, in the prior art mentioned above, in the case where the kinds, sizes and shapes of the powdered objects are different from one another, such as powdered coffee and the powdered developer, and powdered coffee and the green tea, entirely different constant quantity discharging containers are used. Furthermore, supposing that even if an excellent general purpose constant quantity discharging device for a powdered object is considered which can deal with different kinds of powdered objects, since the structure is complicated, it has not been realized. Furthermore, also as to the function no device has been realized which satisfies all of the constant quantity measuring property, operability, and durability.

SUMMARY OF THE INVENTION

The present invention was made to solve the above-mentioned problems, and it is an object to provide a constant quantity discharging device for a powdered object which is excellent not only in the general purpose property; but also in the constant quantity measuring property, operability, and durability.

In a first aspect of the invention, a constant quantity discharging device for discharging a constant quantity of powdered object from a powdered object accommodating container comprises a fixed cap made of a thick disk fixed to an opening portion of the powdered object accommodating container, a rotary disk slidably and rotatably disposed on a surface of the fixed cap at a side of the powdered object accommodating container, a rotary cap slidably and rotatably disposed on a surface of the fixed cap at the opposite side of the powdered object accommodating container, rotation force transmitting means for integrating the rotary disk and the rotary cap in a direction of rotation, a powdered object storing aperture penetrating vertically through a peripheral portion of the fixed cap, a powdered object taking out aperture formed in the rotary disk to overlap with the powdered object storing aperture, a powdered object discharging aperture formed in the rotary cap to overlap with the powdered object storing aperture and to be spaced from the powdered object taking out aperture in a circumferential direction by at least a width of the powdered object storing aperture, rotation range restricting means for restricting a rotation range of the rotary disk and the rotary cap with respect to the fixed cap in a range which includes at least a powdered object taking out position at which the powdered object storing aperture and the powdered object taking out aperture are overlapped with each other and a powdered object discharging position at which the powdered object discharging aperture and the powdered object storing aperture are overlapped with each other. In this respect, the powdered objects include not only powdered coffee, powdered milk, powdered detergent, granule type and powder type pharmaceuticals, metal powder, and various kinds of powder and grain, but also line-shaped objects, such as leaves and stems of green tea, and leaves of black tea.

Here, in the constant quantity discharging device, the fixed cap may be mounted to the opening portion of the powdered object accommodating container by threading a male thread at the fixed cap mounting portion so that the fixed cap engages the male thread at the opening portion of the powdered object accommodating container, or the fixed cap mounting portion is made from elastic rubber excellent in tensile stress and tensile strength so that the fixed cap is closely attached to the opening portion of the powdered object accommodating container. When the powdered object accommodating container is always used upside down, the fixed cap may be secured to the opening portion beforehand, and powdered objects may be inserted into the powdered object accommodating container from the bottom side thereof. The powdered object taking out aperture, the powdered object storing apertures and the powdered object discharging aperture are not necessarily required to have an identical cross sectional shape; however, it is necessary that these apertures pass the powdered object when they are overlapped with each other, and these apertures block the passage when they are not overlapped with each other.

Furthermore, the rotation range restricting means includes every means for restricting the rotation range of the rotary disk and the rotary cap with respect to the fixed cap, and, for example, means for aligning positions by forming projections on an outer peripheral surface of each of the fixed cap and the rotary cap, or means for defining the rotation range by forming a groove in an outer peripheral surface of the fixed cap extending continuously in a circular direction for a certain length, and by forming a protruding portion on the rotary cap so that the protruding portion is rotated by being guided by the groove. Here, the rotary disk and the rotary cap may be rotated manually by using the projections which serve as the rotation range restricting means as knobs for manual rotation. Furthermore, when the powdered object accommodating container dedicated to the container is prepared, a rotary handle for rotating the rotary disk may protrude from a bottom surface of the container, or the rotary cap may be rotated merely with a hand without providing the handle. Furthermore, if the above-mentioned rotation range is satisfied, it may be used as a starting point, that is, a position at which the powdered object storing aperture and the powdered object taking out aperture which are located nearer to this side in the direction of rotation are not overlapped with each other, and the powdered object storing aperture is blocked by the rotary disk and the rotary cap.

In a second aspect of the present invention, cutting means are respectively provided on opposing sides of the powdered object storing aperture and the powdered object taking out aperture, the opposing sides opposing to each other when the powdered object storing aperture and the powdered object taking out aperture rotate towards the powdered object discharging position after both of the apertures are overlapped with each other at the powdered object taking out position. The cutting means include edged tools, such as cutter blades, which are respectively provided on the powdered object storing aperture and the powdered object taking out aperture, and, further, includes the case where an edge portion of the powdered object storing aperture is made from ceramic having an acute angle, and a cutter blade is provided on the powdered object taking out aperture so that a cutting function is performed by mutual sliding movements of the powdered object storing aperture and the powdered object taking out aperture.

In a third aspect of the present invention, a plurality of the powdered object storing apertures are formed. In this case, the plurality of the powdered object storing apertures includes not only the apertures which are formed with intervals therebetween; but also a large powdered object storing aperture which is partitioned into a plurality of chambers. In such a case, the rotation restricting means may be provided plural in number corresponding to the number of the powdered object storing chambers or apertures, or many steps of holding portions or scales may be provided in one rotation restricting means to restrict the rotation range.

In a fourth aspect of the present invention, a knob for rotation is provided on an end portion opposite to the opening portion of the powdered object accommodating container. This knob for rotation is connected by a rotary shaft to at least one of the rotary disk and the rotary cap.

In a fifth aspect of the present invention, a scale for reading a rotation position of the knob for rotation is provided.

In a sixth aspect of the present invention, a stirring vane is fixed to the rotary shaft.

In a seventh aspect of the present invention, a rotatable stirring vane is provided in a space of the rotary disk at an opposite side of the fixed cap, and stirring vane driving means is provided to rotate the stirring vane at a different rotation speed from that of the rotary disk. The stirring vane driving means includes, for example, two large and small gears connected to each other. The two gears are connected by the rotary disk or the stirring vane, or a pulley is connected by a belt in place of the gears.

In an eighth aspect of the present invention, a stand for supporting the powdered object accommodating container which is movable in a vertical direction is provided.

In the constant quantity discharging device for powdered object in the present invention, a constant quantity of powdered object can be taken out by rotating the rotary disk and the rotary cap without removing a cover of the powdered object accommodating container each time.

Specifically, in the first aspect of the invention, the constant quantity discharging device for powdered object is used by securing its fixed cap to the opening portion of various powdered object accommodating containers. The rotary disk and the rotary cap are disposed at opposite sides of the fixed cap sandwiching the fixed cap which is formed by a thick disk. The rotary disk and the rotary cap are slidably rotated in the same direction with respect to the fixed cap by the rotation force transmitting means which integrates the rotary disk and the rotary cap in the direction of rotation. Furthermore, by the rotation range restricting means for restricting the rotation range, the powdered object taken out by the constant quantity discharging device from the powdered object accommodating container is discharged in a constant quantity through the powdered object taking out aperture, the powdered object storing aperture, and the powdered object discharging aperture in the following manner.

Normally, the rotary disk and the rotary cap are positioned at the powdered object taking out position. At this time, the powdered object storing aperture is opened at the rotary disk side and is blocked at the rotary cap side. As a result, the powdered object storing aperture is filled with the powdered object, and the inside of the powdered object accommodating container and the powdered object storing aperture is shuttered from the outer atmosphere. When a constant quantity of powdered object is to be discharged, the rotary disk and the rotary cap are rotated towards the powdered object discharging position. At this time, the powdered object storing aperture is blocked by the rotary disk and the rotary cap. In this case, since the rotary disk is slidably rotating, the powdered object located at the opening portion of the powdered object storing aperture is in a condition where it is slidingly cut, and the same volume of the powdered object as the volume of the powdered object storing aperture, that is, the constant quantity of powdered object is stored in the powdered object storing aperture. Accordingly, if the volume of the powdered object storing aperture, that is, the thickness of the fixed cap and the cross sectional shape of the powdered object storing aperture are changed, the discharging quantity of the powdered object is set to a wide range. Furthermore, since the rotary cap side of the powdered object storing aperture is blocked by the rotary cap at the above-mentioned rotation position, the powdered object is not spilled out and the outer atmosphere does not substantially enter into the powdered object accommodating container and the powdered object storing aperture.

When the rotary disk and the rotary cap are rotated to the powdered object discharging position of the rotation range restricting means, the powdered object storing aperture is opened at the rotary cap side, and the constant quantity of powdered object is discharged to the outside from the powdered object discharging aperture. At this time, since the rotary disk side of the powdered object discharging aperture is blocked by the rotary disk, the time during which the inside of the powdered object accommodating container is exposed to the atmosphere is substantially zero as compared with the conventional technique. Furthermore, by virtue of the slidable rotation of the rotary cap, the powdered object is not spilled out to the outside other than through the powdered object discharging aperture.

In the second aspect of the invention, since the cutting means is provided on each of the powdered object discharging aperture and the powdered object taking out aperture, when the rotary disk is at the powdered object taking out position, line-shaped objects located at the opening portion at the rotary disk side of the powdered object storing aperture are cut when the rotary disk is further rotated, and when the powdered object storing aperture and the powdered object taking out aperture pass by each other, and even when the powdered object is a line-shaped object, it is stored in the powdered object storing aperture in the cut condition.

In the third aspect of the invention, since the plurality of powdered object storing apertures are provided, each discharge quantity at each time is determined in dependence on the number and volume of the powdered storing apertures utilized at that time.

In the fourth aspect of the invention, when the knob for rotation is rotated, the rotary disk and the rotary cap which are connected to the knob for rotation by the rotary shaft are rotated simultaneously. Since the knob for rotation is provided at an end portion on the opposite side of the opening portion of the powdered object accommodating container, it can be manipulated simply by a human hand, and thus, it is possible to easily rotate the rotary disk and the rotary cap.

In the fifth aspect of the invention, the scale for reading the rotation position of the knob for rotation is provided. Thus, by making scale marks corresponding to respective predetermined quantities, for example, to one gram, two grams, and so on of the powdered object, it is possible to visually adjust the quantity of the powdered object.

In the sixth aspect of the invention, since the stirring vane is fixed to the rotary shaft, when the knob for rotation is rotated, the rotary shaft is also rotated and thus, the stirring vane is rotated to stir the powdered object. Accordingly, it is possible to discharge a constant quantity of powdered object which tends to easily form a bridge within the constant quantity discharging device, such as a long line-shaped object including stems of green tea, or which tends to be solidified, such as powdered milk.

In the seventh aspect of the invention, since the stirring vane and the driving means for rotating and driving the stirring vane are provided, the stirring vane cuts the bridge and breaks the solid before the long line-shaped object and the solidified powdered object enter the powdered object storing aperture to prevent the long line-shaped object and the solidified powdered object from entering the powdered object storing aperture thereby enabling a constant quantity to be discharged with high accuracy.

In the eighth aspect of the invention, the powdered object accommodating container can be moved up and down depending of the height of a discharge destination, such as a hollow cylindrical member having a large height or a dish having a small height.

DESCRIPTION OF THE PREFERRED EMBODIMENTS

First Embodiment

Figure 1:
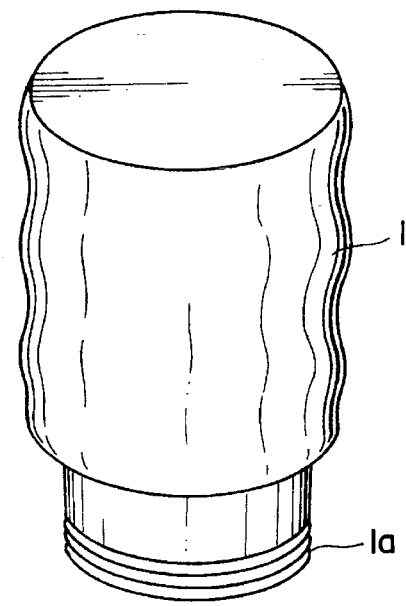
FIG. 1 is a perspective view of a disassembled constant quantity discharging device for a powdered object in a first embodiment of the present invention.
Figure 1:
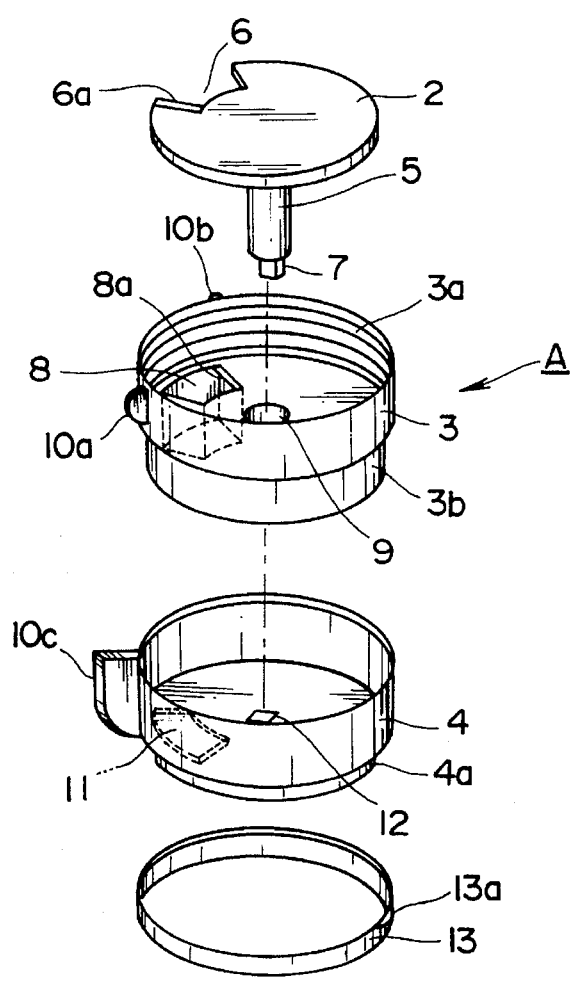
Figure 3:
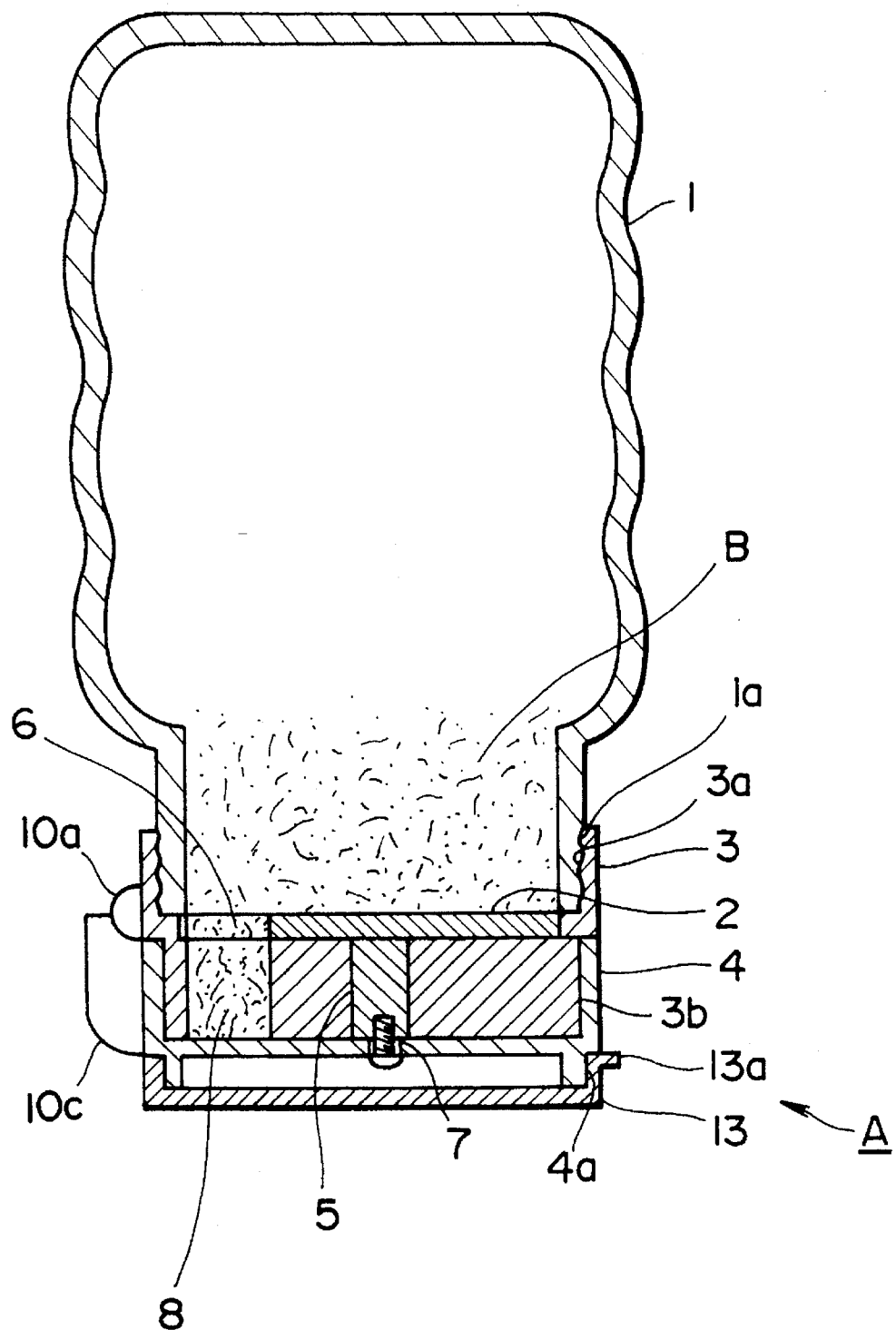
FIG. 3 is a longitudinal sectional view of the constant quantity discharging device for a powdered object shown in FIG. 1.

FIGS. 1 and 3 show a first embodiment, and in these figures, reference numeral 1 designates a powdered object accommodating container. The object accommodating container 1, in this embodiment, has a male thread portion 1a at an opening portion, and a concave or groove portion in a trunk portion so that the container 1 is easily grasped with fingers. This container 1 is used to accommodate by shifting powdered object B thereinto. A constant quantity discharging device A for powdered object includes a rotary disk 2, a fixed cap 3 and a rotary cap 4.

The rotary disk 2 has a cylindrical rotary shaft 5 protruding downwardly from a center of a lower surface. The rotary shaft serves as a rotation force transmitting means. The rotary disk 2 has a sector-shaped powdered object taking out aperture 6 formed by cutting away a part of a peripheral portion thereof. One of the edges of the powdered object taking out aperture 6 which extends radially has a cutter blade 6a which projects inwardly or towards the other edge of the aperture 6. The rotary shaft 5 has a square-shaped member 7 at a tip end portion, which square-shaped member 7 protrudes downwardly.

The fixed cap 3 is a thick disk having a hollow portion formed in an upper surface. A female thread portion 3a is formed in an inner peripheral surface of the hollow portion so that the female thread portion 3a is engaged with the male thread portion 1a of the container 1. The fixed cap 3 has a powdered object storing aperture 8 penetrating vertically from a peripheral portion of an upper surface, or a bottom surface of the hollow portion of the fixed cap 3. The cross sectional shape of the powdered object storing aperture 8 is identical with that of the powdered object taking out aperture 6. Furthermore, a shaft bore 9 is formed at a center portion of the fixed cap 3 penetrating therethrough to receive the rotary shaft 5 of the rotary disk 2. The powdered object storing aperture 8 has a cutter blade 8a as cutting means formed on an edge portion which is located at a position circumferentially opposing the cutter blade 6a of the rotary disk 2 and which is on the upper surface of the rotary cap 3 at the side of the female thread 3a. The cutter blade 8a opposes the other edge of the aperture 8 and also extends radially. Furthermore, the fixed clap 3 has a fitting portion 3b at a lower portion formed by a reduced diameter or a step-down portion so that the fitting portion 3b fits into the rotary cap 4. The fixed cap 3 also has projections 10a and 10b on an outer peripheral surface projecting at two positions spaced from each other in a circumferential direction by two times a width of the powdered object storing aperture 8.

The rotary cap 4 is fitted about the outer peripheral surface of the fixed cap 3 at the fitting portion 3b. A powdered object discharging aperture 11 having an identical cross sectional shape is formed at a peripheral portion of a bottom wall penetrating therethrough. Furthermore, a square aperture 12 is formed at a center portion of the bottom wall so that the square-shaped member 7 of the rotary disk 2 fits into the square aperture 12. The rotary cap 4 has a knob 10c for rotation formed on an outer peripheral surface protruding outwardly and upwardly towards the fixing cap 3 beyond an upper end of the rotary cap 4 to circumferentially engage the projections 10 and 10b on the fixed cap 3. A combination of the knob 10c with the projections 10a and 10b constitutes a rotation range restricting means. Further, in this embodiment of the constant quantity discharging device A, the rotary cap 4 has a table portion 4a at an end portion opposite to the fixing cap 3 side. A cover 13 having a tongue piece 13a is provided so that the cover 13 is removable from the table portion 4a.

Figure 2A:
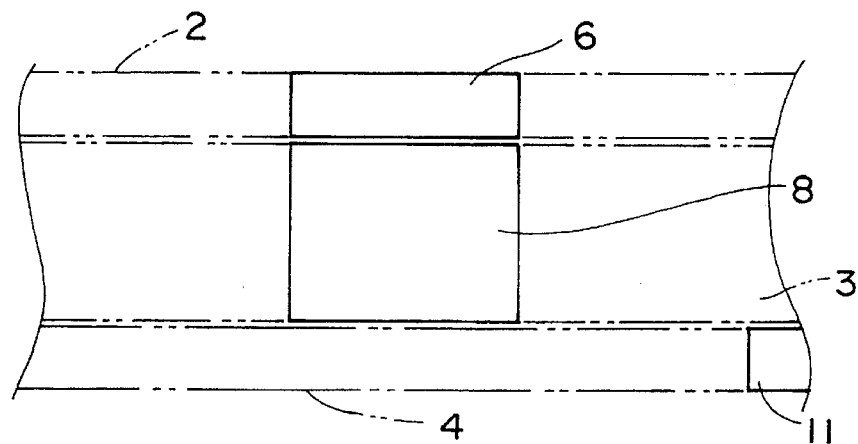
FIGS. 2a, 2b and 2c are diagrams useful to explain a rotation range of a rotary disk and a rotary cap which are restricted by rotation range restricting means in the constant quantity discharging device for a powdered object.
Figure 2B:
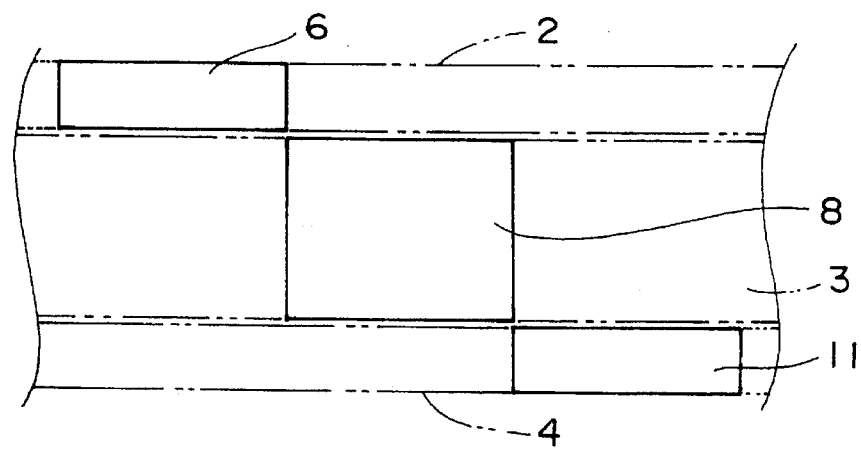
Figure 2C:
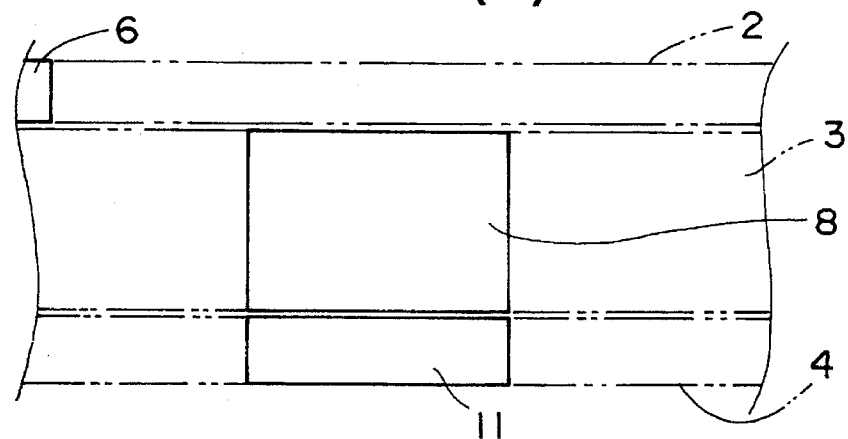

In the constant quantity discharging device A for a powdered object, by inserting the rotary shaft 5 through the square-shaped member 7 into the square aperture 12 of the rotary cap 4 and fixing by a screw, the rotary disk 2 and the rotary cap 4 are connected as one body which is slidable and rotatable in the same direction on both upper and lower surfaces of the fixed cap 3, respectively. Here, the rotary disk 2 and the fixed cap 3, and the fixed cap 3 and the rotary cap 4 are respectively fitted so that the powdered object taking out aperture 6, the powdered object storing aperture 8 and the powdered object discharging aperture 11 are positioned in relationships as shown in FIGS. 2a, 2b and 2c. In these positions, the knob 10c for rotation is sandwiched between the projections 10 and 10b.

Specifically, the powdered object taking out aperture 6 and the powdered object discharging aperture 11 are spaced from each other in a circumferential direction by a distance equal to the width of the powdered object storing aperture 8. When the knob 10c for rotation is in contact with the projection 10a and sandwiched between the projections 10a and 10b, as shown in FIG. 2a, the powdered object taking out aperture 6 and the powdered object storing aperture 8 are overlapped with each other, and when the knob 10c for rotation is in contact with the projection 10b, as shown in FIG. 2c, the powdered object storing aperture 8 is overlapped with the powdered object discharging aperture 11.

The constant quantity discharging device A for a powdered object described above is mounted to the male thread portion 1a of the powdered object accommodating container 1 containing, for example, leaves of black tea, as the powdered object B. The powdered object accommodating container 1 is held by utilizing the groove of the trunk portion of the container 1 so that the constant quantity discharging device A for a powdered object is positioned at the lower side of the powdered object accommodating container 1. When a tea pot or the like is placed beneath the constant quantity discharging device A, a constant quantity of the powdered object B (leaves of black tea) is discharged in the following manner.

The position where the knob 10c for rotation is in contact with the projection 10a is defined as a powdered object taking out position, and normally, the knob 10c is positioned at this position. At this time, since the powdered object taking out aperture 6 and the powdered object storing aperture 8 are overlapped with each other, the powdered object B falls by its weight to the powdered object storing aperture 8 from the powdered object accommodating container 1 through the powdered object taking out aperture 6, and the powdered object B is stored therein.

When the knob 10c for rotation is moved towards the projection 10b, the rotary disk 2 and the rotary cap 4 are rotated at the same time. At this time, the rotary disk 2 is rotated in close contact with the fixed cap 3, and thus, the rotary disk 2 is rotated to slidably cut the powdered object B at the upper opening portion of the powdered object storing aperture 8. When the knob 10c for rotation is moved to an intermediate point between the projections 10 and 10b, the upper and lower opening portions of the powdered object storing aperture 8 are blocked respectively by the rotary disk 2 and the rotary cap 4. Here, when the cutter blades 6a and 8a provided to the powdered object taking out aperture 6 and the powdered object storing aperture 8 pass by opposing each other, a line-shaped object such as leaves of black tea, is cut. Accordingly, a constant quantity of a powdered object B is always stored in the powdered object storing aperture 8, and also it is possible to prevent the line-shaped object from bridging and disturbing the rotation of the rotary disk 2.

When the knob 10c for rotation is further moved to the projection 10b, the powdered object storing aperture 8 and the powdered object discharging aperture 11 are overlapped with each other, and the powdered object storing aperture 8 remains blocked at the upper side, that is, the powdered object accommodating container 1 side, and the lower side of the powdered object storing aperture 8 are opened. As a result, the powdered object B in the powdered object storing aperture 8 falls by its weight, and a constant quantity of the powdered object B is discharged from the powdered object discharging aperture 11 to a tea pot or the like placed beneath the constant quantity discharging device A. After the powdered object B in the powdered object storing aperture 8 has been discharged, the knob 10c for rotation is reverse rotated to return to the projection 10a, and the table portion 4a is covered by the cover 13. By this cover 13, it is possible not only to effectively prevent the powdered object B remaining in the constant quantity discharging device A from being humidified, but also to prevent the powdered object B attached to another peripheral portion of the powdered object discharging aperture 11 from being scattered on a table. Thus, it is possible to place the constant quantity discharging device A on the table in a sanitary state.

The knob 10c for rotation may be structured so that the knob 10c returns automatically to the position at which the knob 10c is in contact with the projection 10a by a known means, such as a spring action, when the knob 10c is released from fingers, or the rotation of the rotary cap and the rotary disk may be performed electrically from the powdered object taking out position to the powdered object discharging position and from the powdered object discharging position to the powdered object taking out position.

Furthermore, the range of rotation of the rotary disk 2 and the rotary cap 4 with respect to the fixed cap 3 is not limited to the range in the first embodiment, however, when considering that the rotary disk 2 and the rotary cap 4 are reverse rotated after the powdered object B is discharged, and the reason for providing the cutter blades 6a, 8a, the range in this embodiment will be optimum.

Furthermore, in this embodiment, although the cutter blades 6a and 8a are provided to the constant quantity discharging device A for powdered object, the constant quantity discharging device A can be suitably used for powdered coffee which does not contain the line-shaped objects.

Second Embodiment

Figure 4:
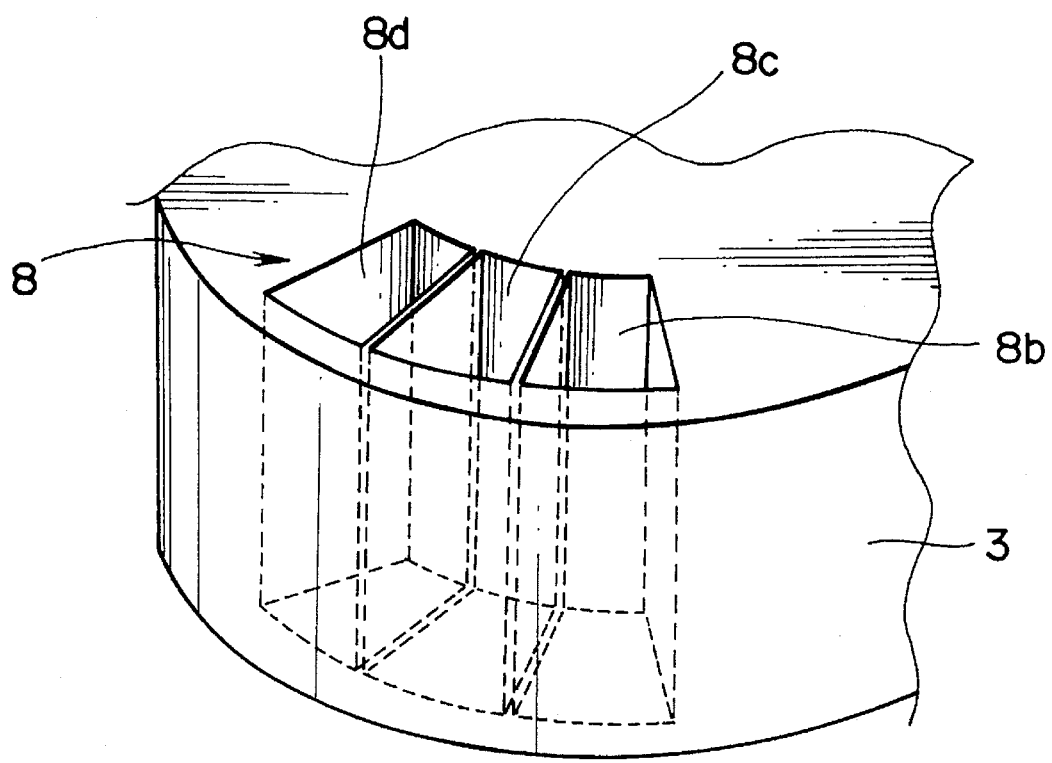
FIG. 4 is a diagram useful to explain a powdered object storing aperture of the constant quantity discharging device in a second embodiment.

FIG. 4 shows a second embodiment of this invention. In this embodiment, the constant quantity discharging device A for powdered object in the first embodiment has a powdered object storing aperture 8 which is extended in a circumferential direction. The powdered object storing aperture 8 is partitioned into three storing chambers 8b, 8c and 8d, and the cutter blade 8a of the powdered object storing aperture 8 is not provided. The other structure is the same as in the first embodiment. However, in the second embodiment, as the rotation range restricting means, other than that used in the first embodiment, a recess may be formed between the projections 10a and 10b so that the knob 10c is loosely fitted into the recess when the powdered object discharging aperture 11 is overlapped with the powdered object storing aperture 8 to inform the user of its arrival at this position.

In the constant quantity discharging device A for powdered object, in the case of the powdered object B which is used by suitably changing the quantity each time, as is the case in powdered coffee, powdered milk, or detergent for washing, it is possible to easily adjust the discharging quantity to the usage.

Third Embodiment

Figure 5:
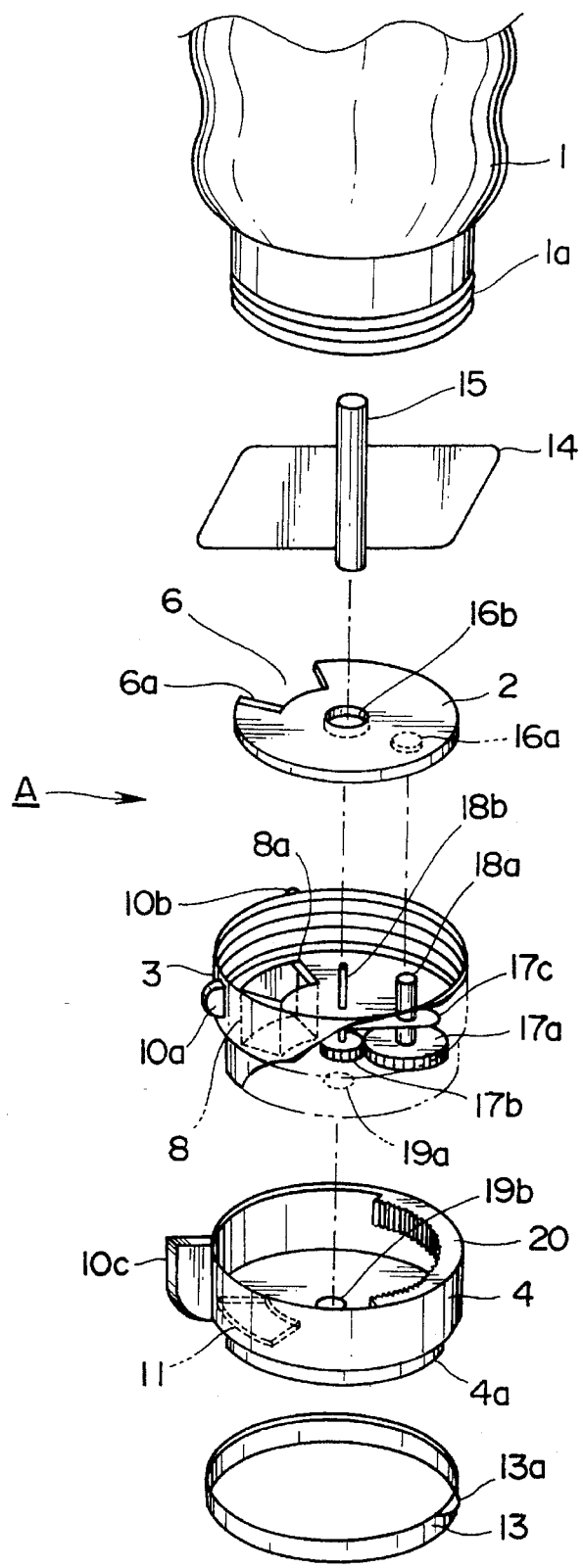
FIG. 5 is an exploded, perspective view of a disassembled constant quantity discharging device for a powdered object in a third embodiment.
Figure 6:
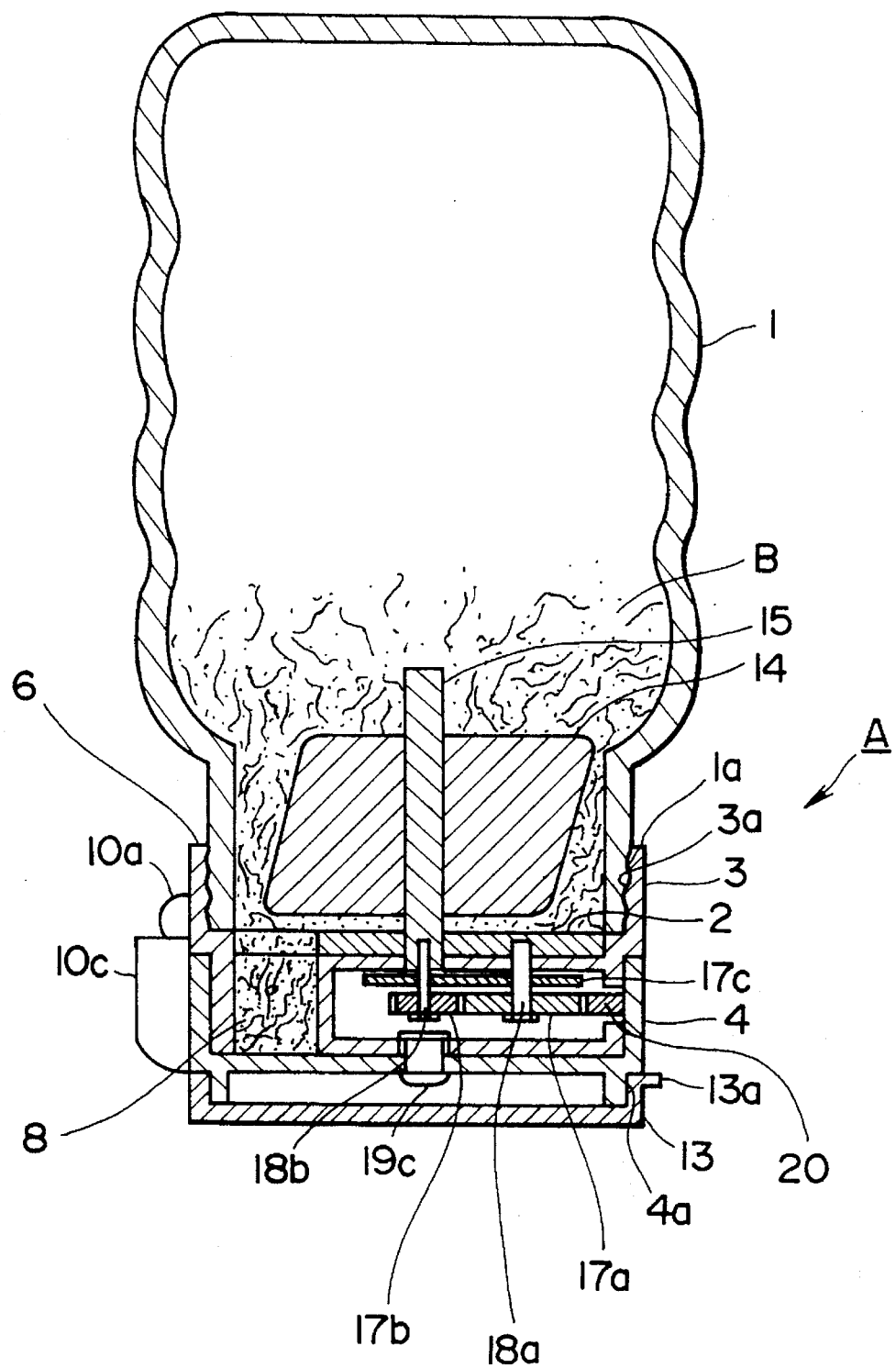
FIG. 6 is a longitudinal sectional view of the constant quantity discharging device for a powdered object shown in FIG. 5.

FIGS. 5 and 6 show a third embodiment of the present invention. In this embodiment, as compared with the first embodiment, the cross sectional shape of the powdered object taking out aperture 6, the powdered object storing aperture 8, and the powdered object discharging aperture 11 are made large, and a stirring vane 14 and rotary driving means for stirring are provided. The like parts to those in the first embodiment are assigned like reference numerals.

The stirring vane 14, in this embodiment, includes a parallelogram vane plate integrally attached to a rotary shaft 15, however, it is not limited to this shape, and, for example, a simple rectangular plate may be used.

In this embodiment, a rotary ,disk 2 has a circular shaft aperture 16b formed at a center portion so that the rotary shaft 15 is inserted therethrough. Beside this, a shaft aperture 16a which does not penetrate is formed in a lower surface of the rotary disk 2 at the side of a fixed cap 3.

The fixed cap 3 is similar to that in the first embodiment in appearance and shape, however, a part of a lower part is hollow, and a rotary large gear 17a is built in the vicinity of a side wall surface, and a small gear 17b for the stirring vane which engages the rotary large gear 17a is built in at a position which is a center portion of the fixed cap 3. In this embodiment, the gear diameter ratio of the rotary large gear 17a and the stirring vane small gear 17b is 2 to 1, however, it is not limited to this diameter ratio, and other diameter ratios may be set. However, it is preferable that the rotary gear has a larger diameter than the stirring vane gear.

The rotary large gear 17a and the stirring vane small gear 17b respectively have a rotary shaft 18a and a rotary shaft 18b which are inserted into and secured to the gears 17a and 17b respectively. Both of the gears 17a and 17b are connected by a connecting plate 17c. Furthermore, an upper shaft end of the rotary shaft 18a is fitted into the shaft aperture 16a. On the other hand, an upper shaft end of the rotary shaft 18b is inserted through the shaft aperture 16b and inserted into and secured to the rotary shaft 15. Furthermore, a front and rear surrounding side wall portion of the rotary large gear 17a of the side surface of the fixed cap 3 is vacant or a window is formed, and an aperture 19a for screw fixing is opened at a center portion of a bottom wall.

In a rotary cap 4, an aperture 19b for screw fixing is opened at a center portion. When the fixed cap 3 and the rotary cap 4 are fixed by a fitting-into screw 19c by using the screw fixing aperture 19b and the screw fixing aperture 19a of the fixed cap 3, an arc-shaped inner gear piece 20 is provided on an inner peripheral surface of the rotary cap 4 at a position facing the vacant side wall portion of the fixed cap 3 so that the arc-shaped inner gear piece 20 engages the rotary large gear 17a. In the embodiment, a combination of the rotary large gear 17a, the rotary shaft 18a and the inner gear piece 20 constitutes a rotation force transmitting means. A combination of the rotary shaft 15, the stirring vane small gear 17b, the connecting plate 17c and the rotary shaft 18b constitute a stirring vane rotational driving means.

In the constant quantity discharging device A for a powdered object, it is supposed that the powdered object B is green tea. In discharging a constant quantity of the powdered object B (green tea), first, the fixed cap 3 is mounted to the powdered object accommodating container 1, and the rotary cap 4 is fixed to the fixed cap 3 by the screw 19c. By rotating the knob 10c for rotation, the rotary large gear 17a which engages the inner gear piece 20 of the rotary cap 4 is rotated. With the rotation of the rotary cap 4, the rotary disk 2 is rotated and, at the same time, the stirring vane small gear 17b which is engaged with the rotary large gear 17a is also rotated. Here, since the stirring vane 14 is directly connected to the stirring vane small gear 17b, it is rotated with the rotation of the rotary disk 2. However, since the gear diameter of the stirring vane small gear 17b is smaller than the gear diameter of the rotary large gear 17a, the stirring vane 14 rotates faster than the rotary disk 2.

As a result, even when a long line-shaped object, such as stems and leaves of the green tea, is contained independently or in a mixed state, and the long line-shaped object forms a bridge in the powdered object accommodating container 1 at the time of taking out of the powdered object, and even when the taking out of the powdered object to the powdered object storing aperture 8 is apt to be disturbed, the long line-shaped object is mowed or cut down when the parallelogram vane of the stirring vane 14 rotates, and the bridge of the long line-shaped object of the leaves and stems of the green tea is broken to achieve the multiplication effect by the large cross sectional shape of the powdered object storing aperture 8. As a result, the powdered object B can be smoothly taken out to the powdered object storing aperture 8.

When the knob 10c for rotation is positioned at an intermediate position between the projections 10a and 10b, the cutter blades 6a and 8a, which form the cutter means, cut the long line-shaped object at the opening portion at the rotary disk 2 side of the powdered object storing aperture 8, and a storing quantity of the powdered object B is made constant. When the knob 10c is further rotated to a position at which the knob 10c is in contact with the projection 10b, it is possible to discharge a constant quantity of the powdered object B into a tea pot or the like which is placed beneath the constant quantity discharging device A.

As described above, in the present embodiment, the constant quantity discharging device A for a powdered object is suitable, in particular, to green tea or the like in which the line-shaped object is mixed and, for example, suitable for a powdered object which is apt to be solidified, such as powdered milk, and it is natural that it is also used for powdered coffee.

Fourth Embodiment

Figure 7:
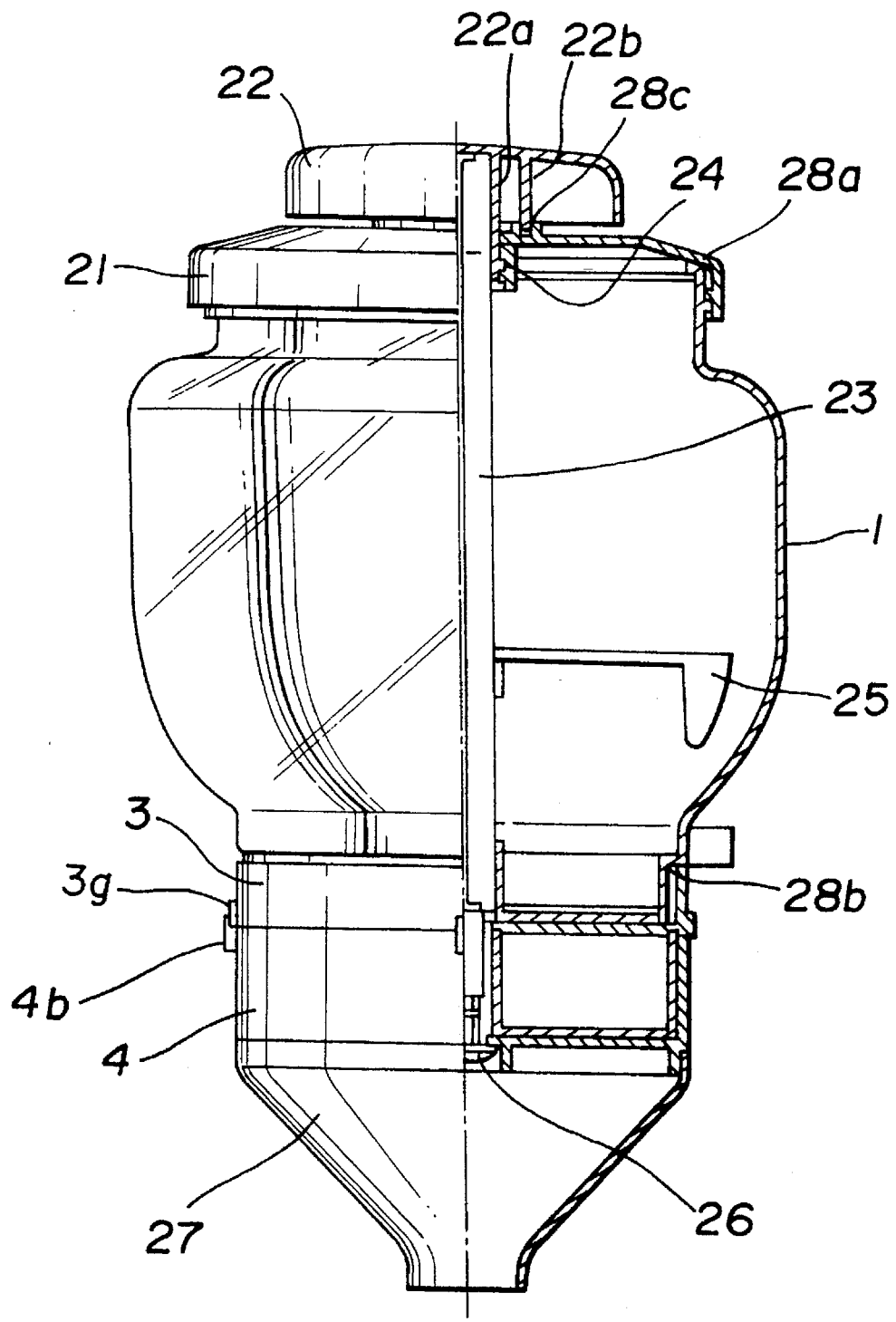
FIG. 7 is a half-sectional view of a constant quantity discharging device for a powdered object in a fourth embodiment.
Figure 8A:
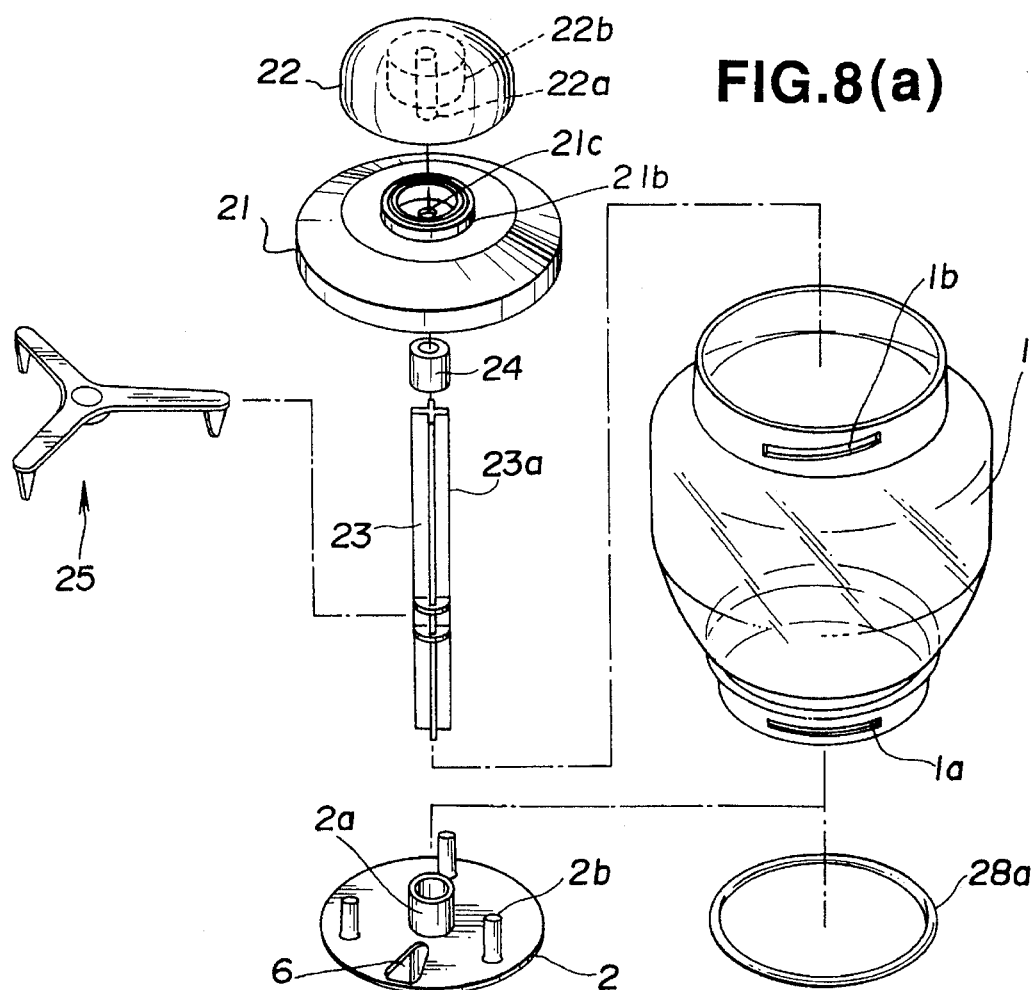
FIG. 8a is a perspective view of the disassembled constant quantity discharging device for a powdered object shown in FIG. 7.
Figure 8B:
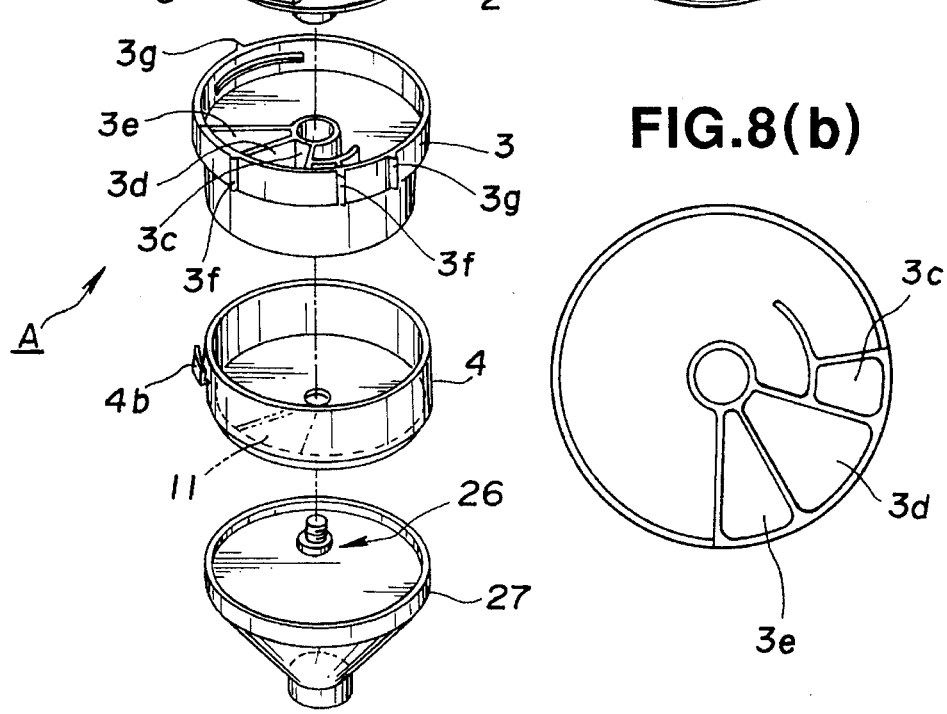
FIG. 8b is a plan view of the fixing cap.

A fourth embodiment of the present invention will be described with reference to FIGS. 7 to 9. In this embodiment, only a different portion will be described, and a description of substantially the same portion as in the previous embodiments will be omitted.

A powdered object accommodating container 1 in this embodiment, has opening portions at opposite sides, that is, at upper and lower end portions. The lower and upper opening portions respectively have male thread portions 1a and 1b formed thereabout.

A cover body 21 has a female thread portion which engages the male thread portion 1b, and a scale 21a of a powdered object discharging quantity attached to a surface of the cover body 21. The cover body 21 is mounted about the male thread portion 1b. A knob 22 for rotation is attached to an upper side of the cover body 21. The knob 22 has a cylindrical protruding portion 22a protruding downwardly from a center of an inner surface, and an annular protruding portion 22b is formed around the protruding portion 22a. On the other hand, the cover body 21 has a penetrating bore 21c at a center for inserting the protruding portion 22a, and an annular guide groove 21c engageable with the protruding portion 22b.

In a state in which the cover body 21 and the knob 22 for rotation are engaged with each other, an upper end portion of a rotary shaft 23 having a cross-shaped cross section is inserted into the protruding portion 22a. The rotary shaft 23 is fixed to the knob 22 by a cylindrical fixing member 24 which is fitted about an end of the protruding portion 22a. On the other hand, a stirring vane 25 is fixed to the rotary shaft 23 at an intermediate position in its longitudinal direction so that the stirring vane 25 is located within the powdered object accommodating container 1 as shown in FIG. 7. Furthermore, the rotary disk 2, the fixed cap 3 and the rotary cap 4 are attached to the male thread 1a side of the powdered object accommodating container 1. These members are formed in one body by the rotary shaft 23.

The rotary disk 2 has a cylindrical protruding portion 2a protruding upwardly from a center portion. The rotary shaft 23 is inserted through the protruding portion 2a. As will be described later, the inside of the protruding portion 2a has a cross-shaped cross section so as to enable attachment to the rotary shaft 23. Furthermore, the rotary disk 2 has a plurality of stirring projections 2b (here three) secured to an upper surface (powdered object accommodating container 1 side). On the other hand, the fixed cap 3 has storing apertures 3c, 3d and 3e respectively corresponding to quantities of, in this example, one spoon, four spoons, and six spoons. The rotary cap 4 is fitted about the fixed cap 3, and the other end face of the rotary shaft 23 is in contact with a center portion of the rotary cap 4 and, at the same time, by screwing a screw 26 from the outside of the rotary cap 4, it is connected integrally. Furthermore, a cone-shaped guide cylinder 27 is mounted to the rotary cap 4. The reference numerals 28a to 28c designate O-rings.

Here, a click mechanism is provided to indicate positions of the quantities of one spoon, four spoons, and six spoons. Specifically, a plurality of projections 3f formed on an outer peripheral surface of the fixed cap 3 are brought into contact with a protruding piece 4b formed on an outer peripheral surface of the rotary cap 4 so that fingers sense that respective positions corresponding to quantities of one spoon, four spoons, and six spoons are reached. Furthermore, at the position of the six spoons and a locked position, a pair of stoppers 3g formed opposing each other on the outer peripheral surface of the fixed cap 3 and the protruding piece 4b of the rotary cap 4 are engaged with each other to act as a stop.

Figure 9:
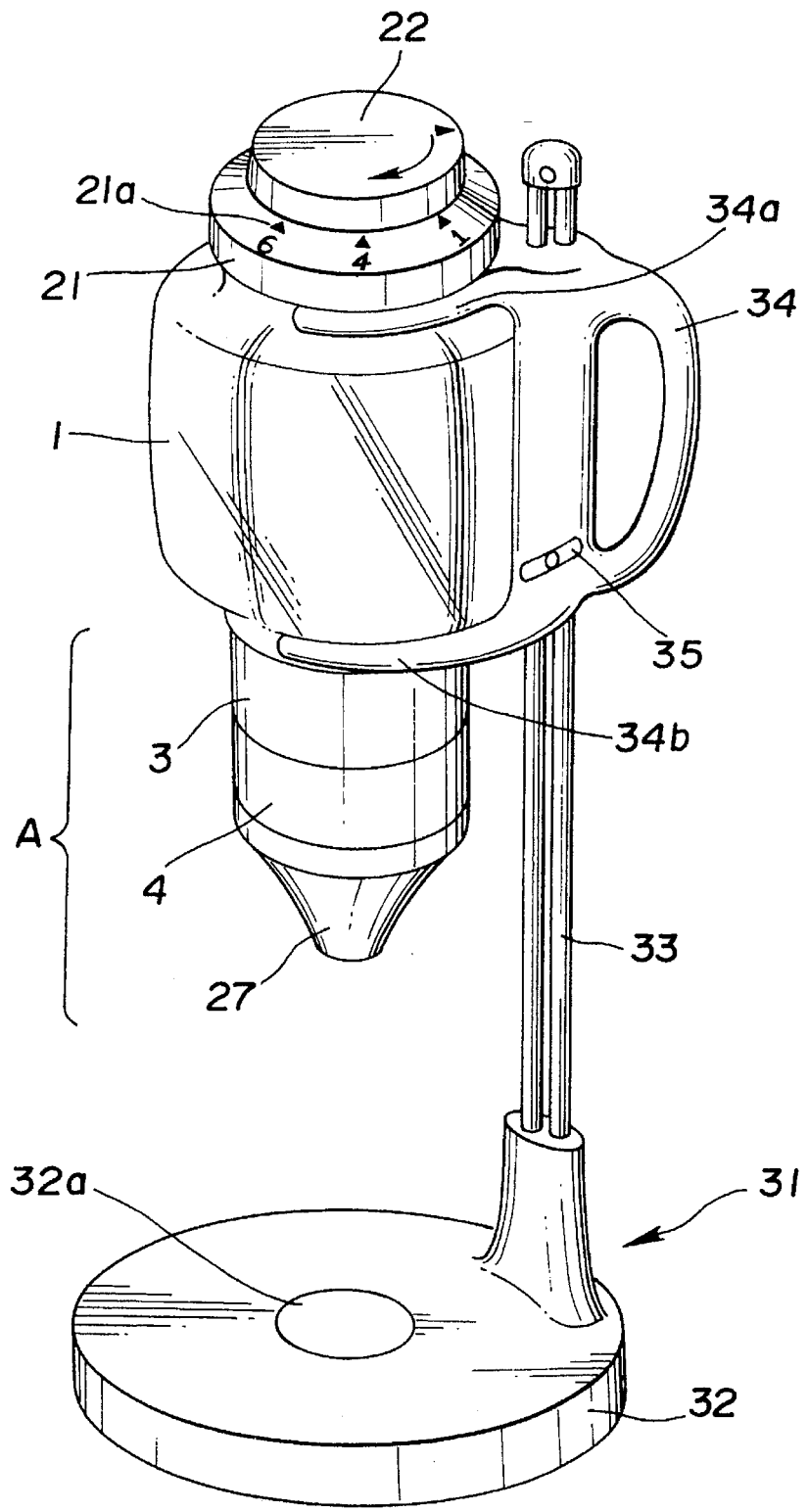
FIG. 9 is a perspective view of the constant quantity discharging device for a powdered object shown in FIG. 7 in actual use.

In using the constant quantity discharging device A for a powdered object described above, it is convenient to use a stand 31 as shown in FIG. 9. The stand 31 includes a pedestal 32 having a recess 32a for positioning a nursing bottle, a cup, or the like when it is placed on the pedestal 32, two parallel guide shafts 33 fixed to the pedestal 32 and rising upright therefrom, and a container holder 34 with a handle having a pair of U-shaped claws 34a and 34b provided with upper and lower positions extending horizontally. In such a stand 31, the container holder 34 is movable, freely guided by the guide shafts 33, and, since the guide shafts 33 are formed by two shafts, the vertical movement of the container holder 34 is smooth by the spring action. The reference numeral 35 designates a stopping screw for securing the container holder 34 to the guide shafts 33.

In discharging a constant quantity of a powdered object B, for example, powdered milk, the knob 22 for rotation is rotated with fingers from the locked position which is a starting position to the scale mark of one spoon. During this process, the powdered object taking out aperture 6 of the rotary disk 2 is positioned on the aperture 3c of the fixed cap 3, which aperture 3c is the smallest aperture and corresponds to a quantity of one spoon. Accordingly, the powdered milk is stored in the storing aperture 3c. At this time, the rotary cap 4 is in a closed state. And when the knob 22 is rotated, the powdered object taking out aperture 6 of the rotary disk 2 is positioned on the adjacent storing aperture 3d corresponding to the volume of three spoons (scale mark indicates the position of four spoons), then to the storing aperture 3e corresponding to the volume of two spoons (scale mark indicates the position of six spoons) sequentially. Thus, the powdered milk is stored in each of the storing apertures 3c to 3e.

In this manner, when the knob 22 for rotation reaches the position of the scale mark of one spoon, the protruding piece 4b is brought into contact with the projection 3f to make the fingers sense that the desired position has been reached. At this time, the powdered object discharging aperture 22 of the rotary cap 4 positioned at the bottom communicates with the upper storing aperture 3c, and the stored powdered milk for one spoon is discharged downwardly. When the knob 22 is further rotated to the position of the scale mark of four spoons, the projection 3f is brought into contact with the protruding piece 4b, and the powdered object discharging aperture 11 is communicated with the upper storing aperture 3d, and stored powdered milk for three spoons is discharged downwardly (total four spoons). When the knob 22 is further rotated to the position of the scale mark of six spoons, this time, the stopper 3g engages the protruding piece 4b to communicate with the upper storing aperture 3e, and stored powdered milk for two spoons is discharged downwardly (total six spoons). At this time, the powdered object taking out aperture 6 of the rotary disk 2 is in a closed state.

As described above, the open and closed relationships between the powdered object taking out aperture 6 of the rotary disk 2 and the powdered object discharging aperture 11 of the rotary cap 4 at the bottom, interposing the storing apertures 3c to 3e therebetween are such that when the powdered object taking out aperture 6 is in a closed state, the powdered object discharging aperture 11 is opened. Specifically, the range of the scale harks from the locked position to the position of six spoons corresponds to an angular range of about 190 degrees.

When a quantity of more than six spoons is required, the knob 22 for rotation is once returned to the locked position, and the above-mentioned operation is performed again. A required quantity can be discharged. Moreover, since the storing aperture 3c stores the volume of one spoon, it is possible to discharge quantities of five spoons, and seven spoons, and it is also possible to combine this with the scale marks of four spoons and six spoons.

As described above, the quantities of one spoon, four spoons, and six spoons from the locked state are indicated on the surface of the cover body 21 by scale marks stepwisely, and the rotation is stopped at respective positions by the click mechanism. As a result, required quantities of powdered milk can be discharged visually and by the aid of the sense of touch. Furthermore, the rotary shaft 23 has a cross-shaped cross section, and the stirring vane 24 is secured to the rotary shaft 23 and, further, a plurality of stirring projections 2b are provided on the rotary disk 2. As a result, it is possible to easily discharge even powdered milk which is apt to be solidified, or long line-shaped objects, such as stems of green tea, without being choked by the action of a protruding ridge member 23a of the rotary shaft 23 and the stirring vane 24. Thus, the constant quantity discharging device can discharge the powdered object more smoothly. Moreover, by using the stand 31, the knob 22 for rotation can be easily manipulated.

In this embodiment, the example of powdered milk is described, however, it is naturally applicable to coffee and tea. Furthermore, in the example of manipulation by the knob for rotation provided with the scale marks, instead of the scale marks, projections and stoppers may be provided on the rotary disk 2 and on the outer surface of the rotary cap 4 so that the rotation is performed by fingers. In this case, the stirring shaft, stirring vane, and the stirring projections may be omitted.

The present invention may be implemented without adherence to the above embodiments. Also, the stand 31 may be applied to the first to third embodiments.

The present invention provides the following advantages.

In the constant quantity discharging device in the present invention, in feeding a powdered object, such as powdered coffee, tea, powdered milk, or the like, to a beverage container or tea pot, such as a cup, a nursing bottle, or the like, it is possible to take out a constant quantity of the powdered object accurately without using other tools. Furthermore, since it is possible to take out the powdered object by reducing the time during which the powdered object within the powdered object accommodating container is in contact with the outer atmosphere, it is possible to prevent humid air from intruding into the powdered object accommodating container which could deteriorate the quality of the powdered object. Accordingly, it is possible to maintain the taste and flavor of the powdered object in the powdered object accommodating container for a long period of time.

In the first aspect of the invention, by virtue of the rotation force transmitting means and the rotation range restricting means, any person can rotate the rotary cap and the rotary disk in the same direction, and in a constant rotation range with respect to the fixed cap. Further, due to the sliding rotation of the rotary disk and the rotary cap with respect to the fixed cap, the powdered object in the powdered object accommodating container is discharged after it is stored in the powdered object storing aperture so that the quantity always reaches a constant quantity. Thus, it is possible to discharge various kinds of powdered objects by a required constant quantity by changing the volume of the powdered object storing aperture depending on its usage. Accordingly, the constant quantity discharging device for a powdered object is excellent in providing the constant quantity, the manipulation property, and the applicability to general purpose. Furthermore, even when the constant quantity discharging device is mounted to the powdered object accommodating container and remains in this state, it is difficult for humid air to enter the powdered object accommodating container and, also, when the powdered object is discharged by a constant quantity, the time during which the powdered object remaining in the powdered object accommodating container is brought into contact with the outer atmosphere is very short as compared with conventional devices.

In the second aspect of the invention, it is possible to accurately discharge not only powder, such as powdered coffee, but also a powdered object which is mixed with line-shaped objects, such as leaves and stems of tea, by a constant quantity. Further it is possible to prevent the line-shaped objects from forming bridges in the powdered object storing aperture, and the constant quantity discharging device can be widely used irrespective of the kinds and shapes of the powdered objects.

In the third aspect of the invention, by providing a plurality of powdered object storing apertures, it is possible to adjust the quantity of discharge each time depending on the kind of the powdered object and the required quantity.

In the fourth aspect of the invention, the manipulation can be performed manually and simply, and the rotation of the rotary disk and the rotary cap can be performed easily.

In the fifth aspect of the invention, it is possible to adjust the quantity of the powdered object visually and simply.

In the sixth aspect of the invention, the constant quantity discharging device can be used for a powdered object which contains long line-shaped objects, such as stems of green tea, and which is apt to be solidified by humid air, such as powdered milk, without causing choking of the constant quantity discharging device. Thus, the durability is excellent. Furthermore, even powdered objects which contain long line-shaped objects and powdered objects which are apt to be solidified can be discharged with accurate constant quantity.

In the seventh aspect of the invention, since the stirring vane and the stirring vane rotary driving means are provided, when the powdered object which contains long line-shaped objects or which is apt to be solidified enters the powdered object storing aperture, the stirring vane breaks any bridges and breaks up the solidified powdered object so that the solidified powdered object is prevented from entering the powdered object storing aperture. Thus, the constant quantity of the powdered object can be discharged accurately.

In the eighth aspect of the invention, when a vessel or the like into which the powdered object is to be discharged is high as is the case of a cylindrical vessel, or when the vessel is low as is the case of a dish, the powdered object accommodating container can be moved up and down depending on the height of the vessel.

What is claimed is:

1. A constant quantity discharging device for discharging a constant quantity of powdered object from a powdered object accommodating container, comprising:

a fixed cap made of a thick disk fixed to an opening portion of the powdered object accommodating container;

a rotary disk slidably and rotatably disposed on a surface of the fixed cap at a side of the powdered object accommodating container;

a rotary cap slidably and rotatably disposed on a surface of the fixed cap at an opposite side of the powdered object accommodating container;

a knob for rotation provided on an upper opening portion of the powdered object accommodating container;

a rotary shaft for connecting said knob to the rotary disk and the rotary cap;

a plurality of powdered object storing apertures of different volumes penetrating vertically through a peripheral portion of the fixed cap;

a scale mark provided on the fixed cap to read a rotation position of the knob for rotation corresponding to a selected one of the plurality of storing apertures;

a powdered object taking out aperture formed in the rotary disk to overlap sequentially with the plurality of powdered object storing apertures;

a powdered object discharging aperture formed in the rotary cap to overlap with the selected one of the plurality of powdered object storing apertures and to be spaced from the powdered object taking out aperture in a circumferential direction by at least a width of the powdered object storing aperture; and rotation range restricting means for restricting a rotation range of the rotary disk and the rotary cap with respect to the fixed cap in a range which includes at least a powdered object taking out position at which the plurality of powdered object storing apertures and the powdered object taking out aperture are overlapped with each other and a powdered object discharging position at which the powdered object discharging aperture and the plurality of powdered object storing apertures are overlapped with each other.

2. A constant quantity discharging device for discharging a constant quantity of powdered object from a powdered object accommodating container, comprising:

a fixed cap made of a thick disk fixed to an opening portion of the powdered object accommodating container;

a rotary disk slidably and rotatably disposed on a surface of the fixed cap at a side of the powdered object accommodating container;

a rotary cap slidably and rotatably disposed on a surface of the fixed cap at an opposite side of the powdered object accommodating container;

rotation force transmitting means for integrating the rotary disk and the rotary cap in a direction of rotation;

a powdered object storing aperture penetrating vertically through a peripheral portion of the fixed cap;

a powdered object taking out aperture formed in the rotary disk to overlap with the powdered object storing aperture;

a powdered object discharging aperture formed in the rotary cap to overlap with the powdered object storing aperture and to be spaced from the powdered object taking out aperture in a circumferential direction by at least a width of the powdered object storing aperture;

rotation range restricting means for restricting a rotation range of the rotary disk and the rotary cap with respect to the fixed cap in a range which includes at least a powdered object taking out position at which the powdered object storing aperture and the powdered object taking out aperture are overlapped with each other and a powdered object discharging position at which the powdered object discharging aperture and the powdered object storing aperture are overlapped with each other; and cutting means respectively provided on opposing sides of the powdered object storing aperture and the powdered object taking out aperture, the opposing sides opposing each other when the powdered object storing aperture and the powdered object taking out aperture rotate towards the powdered object discharging position after both apertures are overlapped with each other at the powdered object taking out position.

3. A constant quantity discharging device for discharging a constant quantity of powdered object from a powdered object accommodating container, comprising:

a fixed cap made of a thick disk fixed to an opening portion of the powdered object accommodating container;

a rotary disk slidably and rotatably disposed on a surface of the fixed cap at a side of the powdered object accommodating container;

a rotary cap slidably and rotatably disposed on a surface of the fixed cap at an opposite side of the powdered object accommodating container;

rotation force transmitting means for integrating the rotary disk and the rotary cap in a direction of rotation;

a powdered object storing aperture penetrating vertically through a peripheral portion of the fixed cap;

a powdered object taking out aperture formed in the rotary disk to overlap with the powdered object storing aperture;

a powdered object discharging aperture formed in the rotary cap to overlap with the powdered object storing aperture and to be spaced from the powdered object taking out aperture in a circumferential direction by at least a width of the powdered object storing aperture;

rotation range restricting means for restricting a rotation range of the rotary disk and the rotary cap with respect to the fixed cap in a range which includes at least a powdered object taking out position at which the powdered object storing aperture and the powdered object taking out aperture are overlapped with each other and a powdered object discharging position at which the powdered object discharging aperture and the powdered object storing aperture are overlapped with each other; and a knob for rotation provided on an end portion opposite to the opening portion of the powdered object accommodating container, the knob for rotation connected by a rotary shaft to at least one of the rotary disk and the rotary cap.

4. The constant quantity discharging device according to claim 3, wherein a scale mark is provided to read a rotation position of the knob for rotation.

5. The constant quantity discharging device according to claim 3, wherein a stirring vane is fixed to the rotary shaft.

6. A constant quantity discharging device for discharging a constant quantity of powdered object from a powdered object accommodating container, comprising:

a fixed cap made of a thick disk fixed to an opening portion of the powdered object accommodating container;

a rotary disk slidably and rotatably disposed on a surface of the fixed cap at a side of the powdered object accommodating container;

a rotary cap slidably and rotatably disposed on a surface of the fixed cap at an opposite side of the powdered object accommodating container;

rotation force transmitting means for integrating the rotary disk and the rotary cap in a direction of rotation;

a powdered object storing aperture penetrating vertically through a peripheral portion of the fixed cap;

a powdered object taking out aperture formed in the rotary disk to overlap with the powdered object storing aperture;

a powdered object discharging aperture formed in the rotary cap to overlap with the powdered object storing aperture and to be spaced from the powdered object taking out aperture in a circumferential direction by at least a width of the powdered object storing aperture;

rotation range restricting means for restricting a rotation range of the rotary disk and the rotary cap with respect to the fixed cap in a range which includes at least a powdered object taking out position at which the powdered object storing aperture and the powdered object taking out aperture are overlapped with each other and a powdered object discharging position at which the powdered object discharging aperture and the powdered object storing aperture are overlapped with each other;

a rotatable stirring vane provided in a space of the rotary disk at an opposite side of the fixed cap; and stirring vane driving means for rotating the stirring vane at a different rotation speed from that of the rotary disk.

7. The constant quantity discharging device according to claim 3, wherein a stand is provided to support the powdered object accommodating container removably.

* * * * *